(12) United States Patent
Miwa et al.

(10) Patent No.: US 12,492,439 B2
(45) Date of Patent: Dec. 9, 2025

(54) METHOD FOR MANUFACTURING MOLTEN IRON WITH ELECTRIC ARC FURNACE

(71) Applicant: JFE STEEL CORPORATION, Tokyo (JP)

(72) Inventors: Yoshihiro Miwa, Tokyo (JP); Koichi Tsutsumi, Tokyo (JP); Ikuhiro Sumi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 828 days.

(21) Appl. No.: 17/772,675

(22) PCT Filed: Oct. 14, 2020

(86) PCT No.: PCT/JP2020/038814
§ 371 (c)(1),
(2) Date: Apr. 28, 2022

(87) PCT Pub. No.: WO2021/090654
PCT Pub. Date: May 14, 2021

(65) Prior Publication Data
US 2022/0403478 A1 Dec. 22, 2022

(30) Foreign Application Priority Data
Nov. 6, 2019 (JP) .................. 2019-201136

(51) Int. Cl.
*C21C 5/30* (2006.01)
*C21C 5/36* (2006.01)
*C21C 5/54* (2006.01)

(52) U.S. Cl.
CPC ................. *C21C 5/30* (2013.01); *C21C 5/36* (2013.01); *C21C 5/54* (2013.01); *C21C 2005/366* (2013.01)

(58) Field of Classification Search
CPC .... C21C 5/30; C21C 5/36; C21C 5/54; C21C 2005/366; C21C 5/527; C21C 2300/02;
(Continued)

(56) References Cited

U.S. PATENT DOCUMENTS

| | | | | |
|---|---|---|---|---|
| 4,389,246 A | * | 6/1983 | Okamura | ................... C10J 3/08 48/206 |
| 4,738,688 A | * | 4/1988 | Nakajima | ................... C10J 3/57 48/210 |

(Continued)

FOREIGN PATENT DOCUMENTS

| | | |
|---|---|---|
| CN | 2000234114 A | 8/2000 |
| CN | 2002363632 A | 12/2002 |

(Continued)

OTHER PUBLICATIONS

JP-2003172584, Igarashi et al., Fine Particle Blowing Device And Refining Method, Jun. 20, 2003 (Year: 2003).*

(Continued)

*Primary Examiner* — Jessee R Roe
*Assistant Examiner* — Michael Aboagye
(74) *Attorney, Agent, or Firm* — Oliff PLC (57) ABSTRACT

A method for manufacturing molten iron by melting a cold iron source in an electric arc furnace having a carbonaceous material-injecting device. The method includes, in the carbonaceous material-injecting device, while a carbonaceous material is injected with a carrier gas through a central portion of the carbonaceous material-injecting device, injecting a fuel and a combustion-supporting gas through respective outer peripheral portions of the carbonaceous material-injecting device. The carbonaceous material injected through the central portion passes through a cylindrical combustion flame generated by a combustion reaction (Continued)

between the fuel and the combustion-supporting gas and is injected into molten slag and molten iron.

10 Claims, 3 Drawing Sheets

(58) Field of Classification Search
CPC . C21C 5/5217; C21B 11/10; F27D 2003/169; F27D 3/16; F27B 3/205
USPC .................................. 266/47, 225, 226, 268
See application file for complete search history.

(56) References Cited

U.S. PATENT DOCUMENTS

| | | | |
|---|---|---|---|
| 5,050,848 A | 9/1991 | Hardie et al. | |
| 6,142,765 A | 11/2000 | Ramaseder et al. | |
| 6,558,614 B1 | 5/2003 | Fritz | |
| 7,445,747 B2 * | 11/2008 | Williams | C21C 5/56 |
| | | | 266/225 |
| 7,722,800 B2 * | 5/2010 | Williams | C21C 5/567 |
| | | | 266/225 |
| 9,580,764 B2 * | 2/2017 | Okuyama | C21C 5/462 |
| 2005/0040571 A1 | 2/2005 | Matthias et al. | |
| 2005/0252430 A1 | 11/2005 | Satchell, Jr. | |

FOREIGN PATENT DOCUMENTS

| | | | |
|---|---|---|---|
| CN | 2010265485 A | 11/2010 | |
| CN | 107208974 A | 9/2017 | |
| EP | 0 848 795 A1 | 6/1998 | |
| EP | 0 866 139 B1 | 7/2002 | |
| EP | 1 092 785 B1 | 2/2004 | |
| JP | H07-145422 A | 6/1995 | |
| JP | H11-304372 A | 11/1999 | |
| JP | 2003172584 A * | 6/2003 | ............... C21C 5/30 |
| JP | 2008-039362 A | 2/2008 | |
| JP | 2013-163828 A | 8/2013 | |
| JP | 2016-509624 A | 3/2016 | |
| KR | 19980080280 A | 11/1998 | |
| RU | 2 025 496 C1 | 12/1994 | |
| RU | 2 301 837 C2 | 6/2007 | |

OTHER PUBLICATIONS

Jan. 30, 2023 Office Action issued in Chinese Patent Application No. 202080075739.2.
Nov. 2, 2021 Office Action issued in Japanese Patent Application No. 2021-507715.
Nov. 11, 2022 Office Action issued in Russian Patent Application No. 2022112227.
Dec. 8, 2022 Search Report issued in European Patent Application No. 20885363.0.
Aug. 22, 2023 Office Action issued in Chinese Patent Application No. 202080075739.2.
May 30, 2023 Office Action issued in Korean Patent Application No. 10-2022-7014368.
Dec. 15, 2020 International Search Report issued in International Application No. PCT/JP2020/038814.

* cited by examiner

METHOD FOR MANUFACTURING MOLTEN IRON WITH ELECTRIC ARC FURNACE

TECHNICAL FIELD

This application relates to a method for manufacturing molten iron by melting a cold iron source in an electric arc furnace.

BACKGROUND

In an electric arc furnace, molten iron (molten pig iron and molten steel) is manufactured by melting a cold iron source such as iron scraps with arc heat, and, generally, oxygen injection and carbonaceous material injection are performed to promote the melting of the cold iron source. Carbonaceous material injection into molten iron and molten slag is performed to reduce iron oxide (FeO), which has been formed by oxygen injection, and to promote the melting of the cold iron source with the combustion heat of the carbonaceous material. In addition, so-called "slag foaming", in which molten slag foams due to CO gas generated as a result of the reduction of the iron oxide by the carbonaceous material injection and as a result of the combustion of the carbonaceous material, is promoted. Due to such slag foaming, since there is a decrease in the amount of arc radiation heat, there is an increase in the melting efficiency of the cold iron source.

Although examples of a method for injecting a carbonaceous material in the related art include an operation in which, while an operator holds a consumable pipe (steel pipe), a carbonaceous material is injected into a furnace through this pipe, nowadays, for example, a method utilizing a movable non-consumable water-cooled lance is used as described in Patent Literature 1 and Patent Literature 2. With this method, since pipe replacement work (connection of a new pipe due to consumption of a pipe) by an operator is not necessary, it is possible to decrease the load placed on the operator.

In addition, other examples of a method for injecting a carbonaceous material include a method in which, as described in Patent Literature 3, a carbonaceous material is injected into a furnace through a carbon injector fixed to the furnace body.

CITATION LIST

Patent Literature

PTL 1: Japanese Unexamined Patent Application Publication No. 7-145422
PTL 2: Japanese Unexamined Patent Application Publication No. 11-304372
PTL 3: Japanese Unexamined Patent Application Publication (Translation of PCT application) No. 2016-509624

SUMMARY

Technical Problem

In the case of the methods described in Patent Literature 1 and Patent Literature 2, since a movable non-consumable water-cooled lance is used, it is possible to efficiently inject a carbonaceous material into molten iron and molten slag. However, since it is necessary that the water-cooled lance be brought close to molten iron and molten slag, a control system with which it is possible to accurately control the height of the lance is necessary. In addition, since the water-cooled lance is brought close to molten iron and molten slag, splashes of the molten iron and the molten slag may adhere to the nozzle tip of the water-cooled lance, which may result in nozzle clogging. Moreover, since the nozzle tip and the lance body may be damaged by the splashes, there is a risk in that vapor explosion due to the leakage of lance-cooling water occurs. In addition, since it is necessary to provide an insertion port for the water-cooled lance on the furnace body, there is an increase in the amount of air entering through the opening formed as the insertion port, which also results in a problem of a deterioration in electric power consumption rate due to a decrease in temperature in the electric arc furnace.

On the other hand, in the case where the carbonaceous material-injecting device fixed to the furnace body is used as described in Patent Literature 3, there is no such problem as nozzle clogging due to splashes or an increase in the amount of air entering through the opening. However, there are problems in that (i) there is a comparatively large distance between the nozzle tip and the liquidus surface of the molten iron, (ii) the flow velocity of the carbonaceous material and a carrier gas injected is attenuated due to the effect of surrounding gas flows (gas flows due to oxygen gas injected through an oxygen lance, gasses generated from the molten slag and the molten iron, air entering from outside the furnace, and the like), and so forth. As a result, it is not possible to efficiently inject the carbonaceous material into the molten iron and the molten slag. In addition, since a carbonaceous material having a comparatively small particle size tends to follow the flow of the carrier gas, the carbonaceous material is not separated from the carrier gas depending on injecting conditions and floats above the liquidus surfaces of the molten iron and the molten slag along the trajectory of the carrier gas, which results in the carbonaceous material being scattered finally outside the furnace. With those problems, there is a deterioration in the yield of the carbonaceous material injected into the molten iron and the molten slag.

In addition, although it may be possible to inject a carbonaceous material and a carrier gas at a high injection flow velocity by simply decreasing the flow channel diameter of a carbonaceous material injection nozzle (for example, by forming a Laval nozzle structure or the like), there is a risk in that the nozzle is clogged with the carbonaceous material in the case where the flow channel diameter of the carbonaceous material injection nozzle is decreased. In the case where the nozzle is clogged with the carbonaceous material as described above, since carbonaceous material injection should be stopped, there is a deterioration in productivity. In addition, there is a risk in that a furnace operation should be stopped depending on conditions.

Therefore, an object of the disclosed embodiments is to solve the problems of the techniques in the related art described above and to provide a method for manufacturing molten iron by melting a cold iron source in an electric arc furnace having a carbonaceous material-injecting device with which it is possible to effectively inject a carbonaceous material into molten slag and molten iron without a deterioration in safety.

Solution to Problem

The inventors diligently conducted investigations to solve the problems described above. As a result, the following are found.

While a carbonaceous material is injected with a carrier gas through the central portion of a carbonaceous material-injecting device, a fuel and a combustion-supporting gas are injected through respective outer peripheral portions so that the carbonaceous material injected through the central portion passes through a cylindrical combustion flame which is generated by a combustion reaction between the fuel and the combustion-supporting gas. As a result, it was found that, since the flow velocity of the carbonaceous material and the carrier gas injected is not attenuated, the carbonaceous material is separated from the carrier gas while the carbonaceous material maintains high inertial force, which results in the carbonaceous material reaching the molten slag and the molten iron and entering the molten slag and the molten iron.

In addition, it was also found that, by controlling the injection flow velocities of the fuel and the combustion-supporting gas to be higher than the injection flow velocity of the carrier gas of the carbonaceous material, there is an increase in the flow velocity of the carbonaceous material and the carrier gas passing through the cylindrical combustion flame, which further increases the effects described above.

The disclosed embodiments have been completed on the basis of the knowledge described above, and the subject matter of the disclosed embodiments is as follows.

[1] A method for manufacturing molten iron with an electric arc furnace, in which a cold iron source is melted to manufacture molten iron, the electric arc furnace having a carbonaceous material-injecting device, in which in the carbonaceous material-injecting device, while a carbonaceous material (a) is injected with a carrier gas through a central portion of the carbonaceous material-injecting device, a fuel (b) and a combustion-supporting gas (c) are injected through respective outer peripheral portions of the carbonaceous material-injecting device, and the carbonaceous material (a) injected through the central portion passes through a cylindrical combustion flame generated by a combustion reaction between the fuel (b) and the combustion-supporting gas (c) and is injected into molten slag and molten iron.

[2] The method for manufacturing molten iron with an electric arc furnace according to item [1] above, in which injection flow velocities of the fuel (b) and the combustion-supporting gas (c) in the carbonaceous material-injecting device are higher than an injection flow velocity of the carrier gas of the carbonaceous material (a) in the carbonaceous material-injecting device.

[3] The method for manufacturing molten iron with an electric arc furnace according to item [1] or [2] above, in which the combustion-supporting gas (c) is supplied in such a manner that an oxygen ratio with respect to an amount of the fuel (b) supplied into the carbonaceous material-injecting device is 1.0 to 1.1.

[4] The method for manufacturing molten iron with an electric arc furnace according to any one of items [1] to [3] above, in which the carbonaceous material-injecting device has a structure in which a carbonaceous material injection pipe (1), a fuel injection pipe (2), and a combustion-supporting gas injection pipe (3) are arranged, in an order mentioned, coaxially from the central portion of the carbonaceous material-injecting device.

[5] The method for manufacturing molten iron with an electric arc furnace according to any one of items [1] to [4] above, in which injection flow velocities of the fuel (b) and the combustion-supporting gas (c) in the carbonaceous material-injecting device are 100 m/s to 500 m/s.

[6] The method for manufacturing molten iron with an electric arc furnace according to any one of items [1] to [5] above, in which a combustion rate of the fuel (b) in the carbonaceous material-injecting device is 400 Mcal/h or more per carbonaceous material-injecting device.

[7] The method for manufacturing molten iron with an electric arc furnace according to any one of items [1] to [6] above, in which a ratio of a combustion rate of the fuel (b) to an injection rate of the carbonaceous material (a) in the carbonaceous material-injecting device is 0.1 Mcal/kg or more.

Advantageous Effects

According to the disclosed embodiments, when a cold iron source is melted to manufacture molten iron in an electric arc furnace having a carbonaceous material-injecting device, it is possible to efficiently inject a carbonaceous material into molten slag and molten iron. Consequently, there are advantages in that (1) it is possible to decrease electric power consumption rate due to an increase in the melting efficiency of the cold iron source, because there is an improvement in the yield of the carbonaceous material injected into the molten slag and the molten iron and (2) there is an improvement in tapping yield, because iron oxide is efficiently reduced by the carbonaceous material.

Moreover, there are advantages in that (3) it is also possible to decrease electric power consumption rate due to an increase in the melting efficiency of the cold iron source, because heat generated by the combustion flame generated by the combustion reaction between the fuel and the combustion-supporting gas is absorbed by the molten iron and the molten slag, (4) there is no risk of nozzle clogging, because it is not necessary to decrease the flow channel diameter of a carbonaceous material injection nozzle, (5) there is an improvement in operability, because as a result of the carbonaceous material-injecting device being fixed to the electric arc furnace body, air does not enter through a portion at which the carbonaceous material-injecting device is attached, (6) there is an improvement in safety due to a decrease in the effect of the splashes of the molten iron and the molten slag, because it is not necessary to bring a nozzle tip close to the molten slag and the molten iron, (7) there is also an improvement in work environment due to a decrease in the amount of dust floating around the electric arc furnace, because there is a decrease in the amount of carbonaceous material scattered outside the furnace, and so forth.

In addition, by controlling the injection flow velocities of the fuel and the combustion-supporting gas to be higher than the injection flow velocity of the carrier gas of the carbonaceous material, there is an increase in the flow velocity of the carbonaceous material and the carrier gas in the process in which the carbonaceous material and the carrier gas pass through the cylindrical combustion flame, and it is thus possible to inject the carbonaceous material more efficiently into the molten slag and the molten iron.

BRIEF DESCRIPTION OF THE DRAWINGS

FIG. 1 is a diagram illustrating the carbonaceous material injection principle using the carbonaceous material-injecting device according to the disclosed embodiments in comparison with a method according to the related art, where

DETAILED DESCRIPTION

A method for manufacturing molten iron with an electric arc furnace according to the disclosed embodiments is a method in which a cold iron source is melted in an electric arc furnace having a carbonaceous material-injecting device to manufacture molten iron and in which, in the carbonaceous material-injecting device, while a carbonaceous material a (powdery and particulate carbonaceous material) is injected with a carrier gas through a central portion of the carbonaceous material-injecting device, a fuel b and a combustion-supporting gas c are injected through respective outer peripheral portions of the carbonaceous material-injecting device. Consequently, the carbonaceous material a injected through the central portion passes through a cylindrical combustion flame generated by the combustion reaction between the fuel b and the combustion-supporting gas c and is injected into molten slag and molten iron. Here, the term "molten iron" denotes molten pig iron or molten steel, and there may be a case where the molten pig iron and the molten steel contain alloy elements such as chromium and nickel.

Figure 1A:
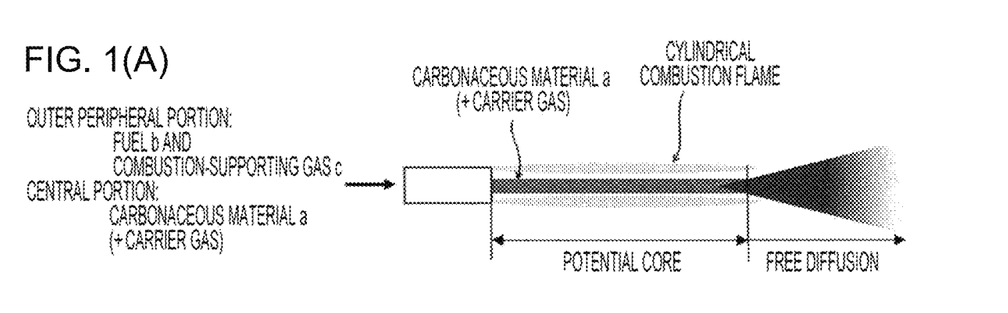
FIG. 1(A) and FIG. 1(B) illustrate the method according to the disclosed embodiments and the method according to the related art, respectively.
Figure 1B:
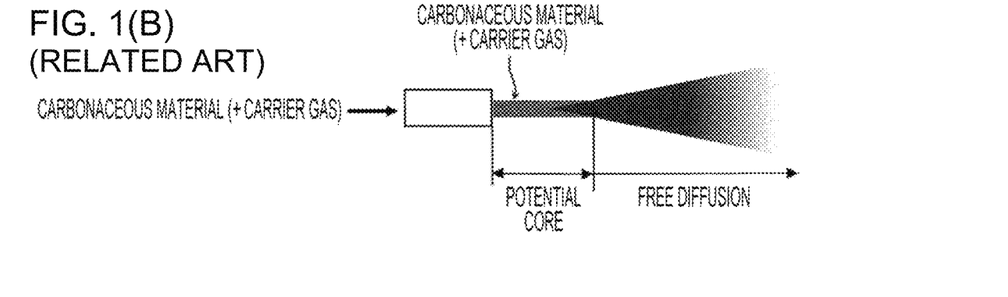

FIGS. 1(A) and 1(B) are diagrams illustrating the carbonaceous material injection principle using the carbonaceous material-injecting device according to the disclosed embodiments in comparison with a method according to the related art, where FIG. 1(A) and FIG. 1(B) illustrate the method according to the disclosed embodiments and the method according to the related art, respectively.

In the method according to the related art illustrated in FIG. 1(B), a carbonaceous material-injecting device is formed of a single-pipe nozzle, and a carbonaceous material is transported with a carrier gas and injected toward molten slag and molten iron in the furnace. At this time, since the flow velocity of the carbonaceous material and the carrier gas, which are injected through the single-pipe nozzle, is rapidly attenuated due to surrounding gas flow, the carbonaceous material and the carrier gas freely diffuse, which results in a decrease in the length of a potential core (area in which initial velocity is maintained). In addition, since a carbonaceous material having a comparatively small particle diameter tends to follow the flow of the carrier gas, the carbonaceous material is not separated from the carrier gas depending on conditions and floats above the liquidus surfaces of the molten iron and the molten slag along the trajectory of the carrier gas, which results in the carbonaceous material being scattered finally outside the furnace.

On the other hand, in the method according to the disclosed embodiments illustrated in FIG. 1(A), a cylindrical combustion flame is generated by the combustion reaction between a fuel b (gas fuel and/or liquid fuel) and a combustion-supporting gas c, and a carbonaceous material a and a carrier gas pass through the cylindrical combustion flame and are injected into molten slag and molten iron. At this time, since the flow velocity of the carbonaceous material a and the carrier gas, which pass through the cylindrical combustion flame, is not affected by surrounding gas flow, the flow velocity is not attenuated, which results in high flow velocity being maintained. That is, there is an increase in the length of a potential core. Therefore, the carbonaceous material a is separated from the carrier gas with high inertial force being maintained, reaches the molten slag and the molten iron, and enters the molten slag and the molten iron. Consequently, the carbonaceous material a is efficiently injected into the molten slag and the molten iron.

In addition, by controlling the injection flow velocities of the fuel b and the combustion-supporting gas c to be higher than that of the carrier gas of the carbonaceous material a, there is an increase in the flow velocity of the carbonaceous material a and the carrier gas in the process in which the carbonaceous material and the carrier gas pass through the cylindrical combustion flame. Consequently, since there is an increase in the effect described above, it is possible to inject the carbonaceous material a more efficiently into the molten slag and the molten iron.

The carbonaceous material a is powdery and particulate. Examples of the carbonaceous material a include coke powder, which is a by-product when coke is manufactured, coal (pulverized fine coal), plastic (particulate or powdery, including waste plastic), and the like, and one or more of these materials may be used.

As the fuel b, a gas fuel and/or a liquid fuel may be used. Examples of the gas fuel include LPG (liquefied petroleum gas), LNG (liquefied natural gas), hydrogen, a by-product gas from a steel plant (C-gas, B-gas, or the like), and a mixture of two or more of these gas fuels, and one or more of these gas fuels may be used. Examples of the liquid fuel include a heavy oil (Bunker A, Bunker B, or Bunker C), light oil, kerosine petroleum, waste oil, and the like, and one or more of these liquid fuels may be used. In addition, the above-mentioned gas fuels and liquid fuels may be used in combination. However, it is preferable that a gas fuel be used as the fuel b from the viewpoint of, for example, ease of combustion (fuel ignition temperature generally decreases in the order of a solid fuel, a liquid fuel, and a gas fuel). Therefore, in the description below, a case in which a gas fuel is used as the fuel b will be described.

As the combustion-supporting gas c, one of pure oxygen (industrial pure oxygen), oxygen-enriched air, and air may be used.

Examples of a gas which may be used as the carrier gas of the carbonaceous material a include one or more of an inert gas such as nitrogen or argon, air, and the like, and, in the case where air is used as the carrier gas, it is preferable that the risk of the ignition or explosion of the carbonaceous material or the like be decreased by installing an anti-backfire valve or the like. In addition, by using an inert gas such as nitrogen or argon, it is possible to decrease the risk of the self-ignition of the carbonaceous material.

The carbonaceous material-injecting device used in the disclosed embodiments has injection pipes so that each of the carbonaceous material a, the fuel b, and the combustion-supporting gas c is injected through the respective pipes. In this carbonaceous material-injecting device, the injection pipe for the carbonaceous material powder is disposed in the central portion of the device, and the injection pipes for the fuel and the combustion-supporting gas are disposed in the outer peripheral portions of the device.

Figure 2:
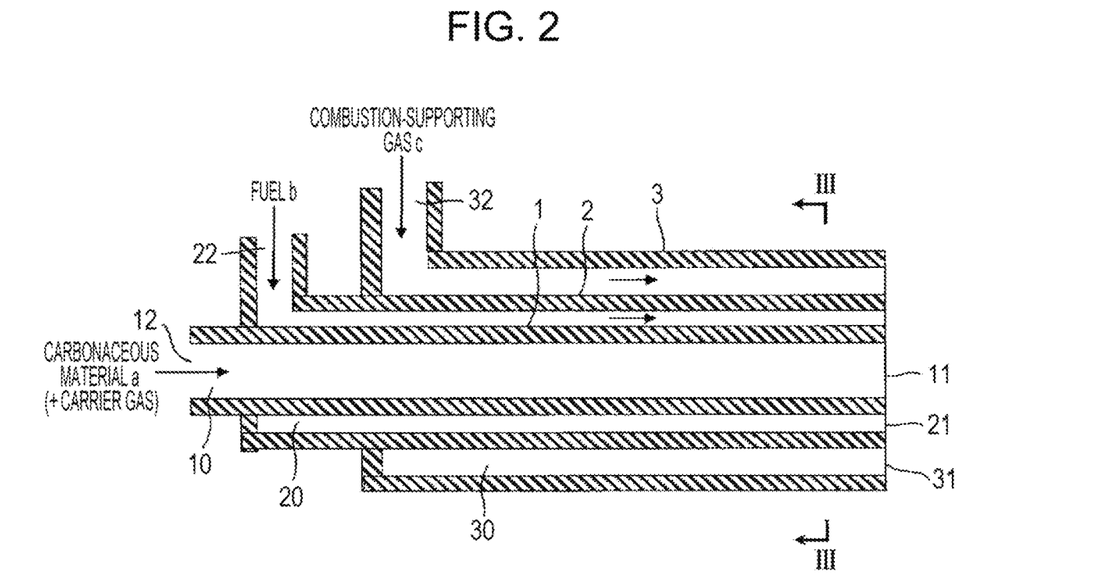
FIG. 2 is a longitudinal sectional diagram schematically illustrating an example of the embodiment of the carbonaceous material-injecting device used in the disclosed embodiments.
Figure 3:
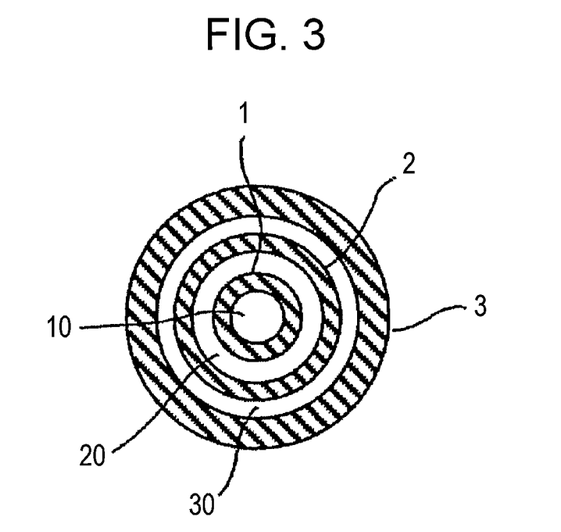
FIG. 3 is a sectional view along line III-III of FIG. 2.

FIG. 2 and FIG. 3 illustrate an example of the carbonaceous material-injecting device used in the disclosed embodiments, where the FIG. 2 is a longitudinal sectional view and FIG. 3 is a sectional view along line III-III of FIG. 2. In this carbonaceous material-injecting device, a main body for supplying the fuel b (gas fuel in the present embodiment), the combustion-supporting gas c, and the carbonaceous material a has a triple-pipe structure in which three pipes are arranged coaxially. That is, this triple-pipe structure is formed of a carbonaceous material injection pipe 1 which is disposed in the central portion, a fuel injection pipe 2 which is disposed outside the pipe 1, and a combustion-supporting gas injection pipe 3 which is disposed outside the pipe 2. Here, usually, spacers are arranged between the injection pipes forming the triple-pipe structure to maintain the spaces between the injection pipes.

The interior space of the carbonaceous material injection pipe 1 forms a carbonaceous material flow channel 10, a space between the fuel injection pipe 2 and the carbonaceous material injection pipe 1 forms a fuel flow channel 20, and a space between the combustion-supporting gas injection pipe 3 and the fuel injection pipe 2 forms a combustion-supporting gas flow channel 30. The front ends of the carbonaceous material injection pipe 1, the fuel injection pipe 2, and the combustion-supporting gas injection pipe 3 are opened to form a carbonaceous material delivery port 11 (injection port), a ring-shaped fuel delivery port 21 (injection port), and a ring-shaped combustion-supporting gas delivery port 31 (injection port), respectively.

In addition, at the tail end of the carbonaceous material-injecting device, a combustion-supporting gas supply port 32 for supplying the combustion-supporting gas to the combustion-supporting gas flow channel 30 is fitted to the combustion-supporting gas injection pipe 3. Similarly, a fuel supply port 22 for supplying the fuel to the fuel flow channel 20 is fitted to the fuel injection pipe 2. Similarly, a carbonaceous material supply port 12 for supplying the carbonaceous material via the carrier gas to the carbonaceous material flow channel 10 is fitted to the carbonaceous material injection pipe 1.

In addition, although it is not illustrated, an inner pipe and an outer pipe are arranged coaxially outside the combustion-supporting gas injection pipe 3, and cooling fluid flow channels (outward channel and inward channel for the cooling fluid), which are communicated with each other, are formed between the outer pipe and the inner pipe and between the inner pipe and the combustion-supporting gas injection pipe 3.

Although the fuel delivery port 21 and the combustion-supporting gas delivery port 31 have a ring shape in the present embodiment, each of the delivery ports may be formed of, for example, plural gas ports arranged at predetermined intervals in the circumferential direction at the end of the injection pipe.

In such a carbonaceous material-injecting device, at the time of carbonaceous material injection, a carbonaceous material a such as coke powder and a carrier gas are injected through the carbonaceous material injection pipe 1, a fuel b (gas fuel) such as LNG is injected through the fuel injection pipe 2, and a combustion-supporting gas c such as oxygen is injected through the combustion-supporting gas injection pipe 3. A cylindrical combustion flame is generated by the fuel b (gas fuel) and the combustion-supporting gas c, and the carbonaceous material a and the carrier gas pass through the cylindrical combustion flame and are injected into molten slag and molten iron.

Examples of a device having a structure similar to the structure of the carbonaceous material-injecting device according to the present embodiment include an auxiliary burner for an electric arc furnace. However, a carbonaceous material is used as a solid fuel in such an auxiliary burner. That is, the carbonaceous material (solid fuel) is combusted (completely combusted) along with a gas fuel such as LNG to allow a cold iron source to absorb the heat of the combustion flame and to eliminate a cold spot (which is distant from an electrode and in which non-uniform melting occurs). Therefore, such a device is different from the carbonaceous material-injecting device used in the disclosed embodiments in terms of purpose of use, function, and method for using the carbonaceous material.

In the disclosed embodiments, the carbonaceous material a injected through the central portion of the carbonaceous material-injecting device passes through a cylindrical combustion flame generated by the combustion reaction between the fuel b and the combustion-supporting gas c and is injected into molten slag and molten iron. That is, main part of the carbonaceous material a passes through the cylindrical combustion flame without being combusted, reaches molten slag and molten iron, and enters the molten slag and the molten iron.

Factors necessary for combustion include three factors, that is, a combustible material, oxygen, and temperature (fire source). In addition, the combustibility of combustible materials decreases in the order of gas, liquid, and solid. This is because, in the gas state, the combustible material and oxygen are easily mixed with each other and the continuation of combustion (chain reaction) tends to occur. In addition, in the case of solid, which has the lowest combustibility, combustion starts after the temperature has reached its ignition temperature.

From such points of view, the factors which inhibit the carbonaceous material a from being combusted are the following items: (1) supplying the combustion-supporting gas c in an amount which is sufficient to combust only the fuel b, (2) increasing the flow velocity of the carbonaceous material a (carrier gas) to inhibit the temperature of the carbonaceous material a from reaching its ignition temperature, (3) inhibiting the particle diameter of the carbonaceous material a from decreasing excessively, because the time required for the carbonaceous material a to reach its ignition temperature and to start being combusted decreases with a decrease in particle diameter, and so forth.

Regarding item (1) above, in the disclosed embodiments, since the fuel b is brought into contact with the combustion-supporting gas c and combusted immediately after having been injected through the nozzle, it is preferable that the flow rate of the combustion-supporting gas be equivalent to or approximately equivalent to the oxygen ratio which is sufficient to combust only the fuel b. Specifically, it is preferable that the amount of the combustion-supporting gas c supplied be controlled so that the oxygen ratio with respect to the amount of the fuel b supplied is 1.0 to 1.1. Here, the term "oxygen ratio" denotes "(amount of oxygen substantially supplied by the combustion-supporting gas)/(theoretical oxygen demand for completely combusting the fuel)".

Regarding item (2) above, for example, in the case where coal is used as the carbonaceous material a, since the ignition temperature of the carbonaceous material is several hundreds of degrees Celsius (1000° C. or higher in the case of coke), it is preferable that the flow velocity of the carbonaceous material a (carrier gas) be increased to inhibit the temperature of the carbonaceous material a from reaching its ignition temperature. Generally, it is considered that the heating rate of particles of the carbonaceous material in a combustion field is about 10° C./ms. In the case where the distance between the injection port of the carbonaceous material-injecting device and the molten slag and the molten steel is about 1 m to 2 m, when the flow velocity of the carbonaceous material a (carrier gas) is, for example, about 20 m/s to 100 m/s, the time required for the carbonaceous material a injected through the injection port to reach the molten slag and the molten iron is as short as 10 ms to 100 ms. It is considered that, in such a short time, the temperature of the carbonaceous material a is not increased to its ignition temperature, in other words, the carbonaceous material a reaches the molten slag and molten iron without being combusted. Therefore, it is preferable that the flow velocity of the carbonaceous material a (carrier gas) be about 20 m/s to 100 m/s.

In the case where the particle diameter of the carbonaceous material a is excessively small, in addition to item (3) above, there is a risk in that the carbonaceous material a is less likely to be separated from the carrier gas as a result of following the flow of the carrier gas. Therefore, it is preferable that the median diameter (D50) of the carbonaceous material a be 20 μm or more. Here, it is possible to determine the median diameter (D50) on the basis of, for example, the particle diameter distribution of the carbonaceous material a which is obtained by using a laser diffractive scattering particle size distribution measuring device.

It is preferable that the carbonaceous material a, the fuel b, and the combustion-supporting gas c be injected through the carbonaceous material-injecting device in consideration of, for example, items (1) to (3) above.

It is preferable that the injection flow velocities of the fuel b and the combustion-supporting gas c be as large as possible from the viewpoint of efficiently injecting the carbonaceous material a. However, in the case where the injection flow velocities are excessively large, since the flame is lost, there is a risk in that it is not possible to stably generate a cylindrical combustion flame. On the other hand, in the case where the injection flow velocities of the fuel b and the combustion-supporting gas c are excessively small, since there is a decrease in the length of the potential core due to a comparatively decreased combustion flame length, there is a decrease in the effect of the disclosed embodiments. In addition, in the case where the combustion flame length is small, since the flame is lost as a result of being blown off due to disturbance in the furnace, there is a risk in that it is not possible to stably generate a combustion flame also in this case. From such points of view, it is preferable that the injection flow velocities of the fuel b and the combustion-supporting gas c be about 100 m/s to 500 m/s.

In addition, in the case where the combustion rate of the fuel b is excessively small, the combustion flame tends to be unstable due to disturbance in the furnace. Therefore, it is preferable that the combustion rate of the fuel b be 400 Mcal/h or more per carbonaceous material-injecting device.

There are also preferable conditions to be applied for the flow rate of the carrier gas of the carbonaceous material a, and it is preferable that the ratio of the amount of the carbonaceous material a to the flow rate of the carrier gas be about 0.5 kg/Nm³ to 15 kg/Nm³. In the case where the ratio of the amount of the carbonaceous material a to the flow rate of the carrier gas is more than 15 kg/Nm³, since there is a deterioration in the transportability of the carbonaceous material a, operation problems, such as one in which a flow channel is clogged with the carbonaceous material a, tend to occur. On the other hand, in the case where the ratio of the amount of the carbonaceous material a to the flow rate of the carrier gas is less than 0.5 kg/Nm³, since there is a decrease in temperature in the furnace due to the carrier gas, there is a risk of a deterioration in operability.

It is possible to calculate the flow rate of the combustion-supporting gas c by using formula (1) below from the flow rate of the fuel b (gas fuel), the theoretical oxygen demand of the fuel (theoretical amount of oxygen required to completely combust the fuel), and the oxygen ratio.

Flow rate of combustion-supporting gas=(oxygen concentration ratio in combustion-supporting gas)×(oxygen ratio)(coefficient)×[(flow rate of fuel)×(theoretical oxygen demand of fuel)]   (1)

Therefore, for example, in the case where the combustion-supporting gas c is pure oxygen (having an oxygen concentration of 100%), the fuel b is LNG, and the flow rate of LNG is 100 Nm³/h, the flow rate of the combustion-supporting gas c is calculated as follows. The theoretical oxygen demand of the fuel is calculated from the carbon content and the hydrogen content or the like in the fuel, and the theoretical oxygen demand of LNG is regarded as about 2.2 Nm³-oxygen/Nm³-LNG. In the case where the oxygen ratio is 1.1, the flow rate of the combustion-supporting gas is calculated as 242 Nm³/h (=1×1.1×[100×2.2]) by using formula (1) above.

In addition, there are also preferable conditions to be applied for the ratio of the combustion rate of the fuel b to the injection rate of the carbonaceous material a (Mcal/kg) in the carbonaceous material-injecting device, and it is preferable that the ratio of the combustion rate of the fuel b to the injection rate of the carbonaceous material a be 0.1 Mcal/kg or more. This is because, in the case where the combustion rate of the fuel b is small with respect to the injection rate of the carbonaceous material, since the flame at the burner tip is blown off by the injected carbonaceous material, the combustion flame is unstable, which results in the effect of the disclosed embodiments not being sufficiently realized.

Figure 4:
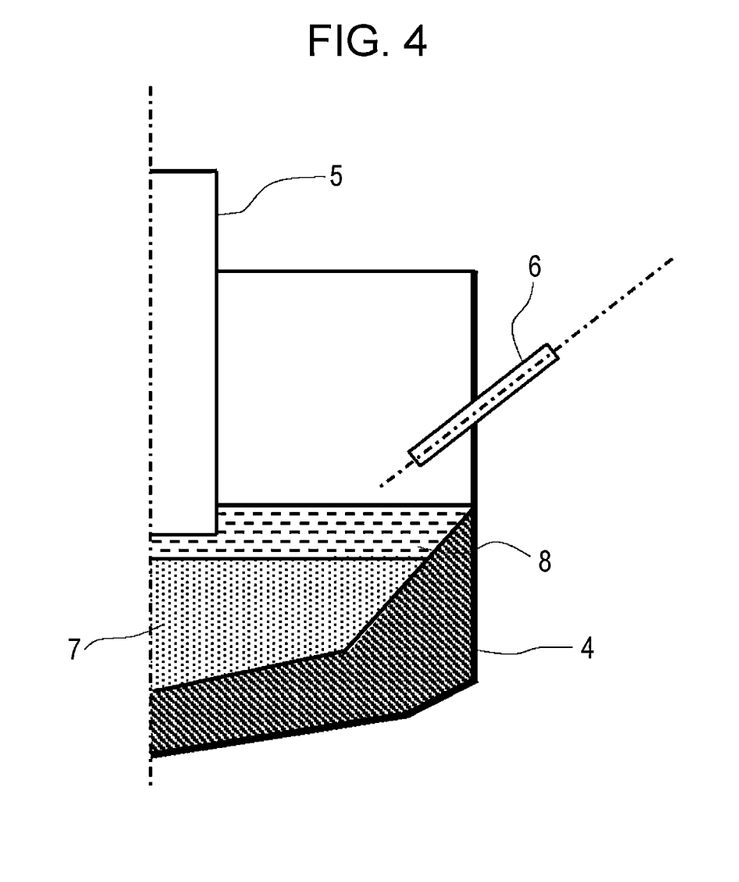
FIG. 4 is a diagram schematically illustrating an example of operation of the embodiment of the disclosed embodiments (longitudinal sectional view in the radial direction of the electric arc furnace).

FIG. 4 is a diagram schematically illustrating an example of operation of the embodiment of the disclosed embodiments (longitudinal sectional view in the radial direction of the electric arc furnace), where reference 4 denotes a furnace body, reference 5 denotes an electrode, reference 6 denotes the carbonaceous material-injecting device, reference 7 denotes molten iron, and reference 8 denotes molten slag. The carbonaceous material-injecting device 6 is installed in the furnace body 4 so as to have an appropriate inclination with respect to the furnace body 4. Usually, one, two, or more carbonaceous material-injecting devices 6 are installed in the furnace body 4.

As indicated by the description above, according to the method for manufacturing molten iron with an electric arc furnace according to the disclosed embodiments, when a cold iron source is melted in an electric arc furnace having a carbonaceous material-injecting device 6 to manufacture the molten iron 7, it is possible to efficiently inject the carbonaceous material a into the molten slag and the molten iron. Consequently, the results described in items (1) and (2) below are realized.

(1) Since there is an improvement in the yield of the carbonaceous material a injected into the molten slag and the molten iron, it is possible to decrease electric power consumption rate due to an increase in the melting efficiency of the cold iron source.

(2) Since iron oxide is efficiently reduced by the carbonaceous material a, there is an improvement in tapping yield.

Moreover, according to the method for manufacturing molten iron with an electric arc furnace according to the disclosed embodiments, the following effects are realized.

(3) Since heat generated by the combustion flame generated by the combustion reaction between the fuel b and the combustion-supporting gas c is absorbed by the molten iron and the molten slag, it is possible to decrease electric power consumption rate due to an increase in the melting efficiency of the cold iron source from another viewpoint.

(4) Since it is not necessary to decrease the flow channel diameter of a carbonaceous material injection nozzle, there is no risk of nozzle clogging.

(5) Since, as a result of the carbonaceous material-injecting device being fixed to the electric arc furnace body, air does not enter through a portion at which the carbonaceous material-injecting device is attached, there is an improvement in operability.

(6) Since it is not necessary to bring a nozzle tip close to the molten slag and the molten iron, there is an improvement in safety due to a decrease in the effect of the splashes of the molten iron and the molten slag.

(7) Since there is a decrease in the amount of carbonaceous material scattered outside the furnace, there is also an improvement in work environment due to a decrease in the amount of dust floating around the electric arc furnace.

In addition, when the injection flow velocities of the fuel b and the combustion-supporting gas c are controlled to be higher than that of the carrier gas of the carbonaceous material a, there is an increase in the flow velocity of the carbonaceous material a and the carrier gas in the process in which the carbonaceous material and the carrier gas pass through the cylindrical combustion flame, and therefore there is an increase in the effect described above. As a result, it is possible to inject the carbonaceous material a more efficiently into the molten slag and the molten iron.

EXAMPLES

Figure 5:
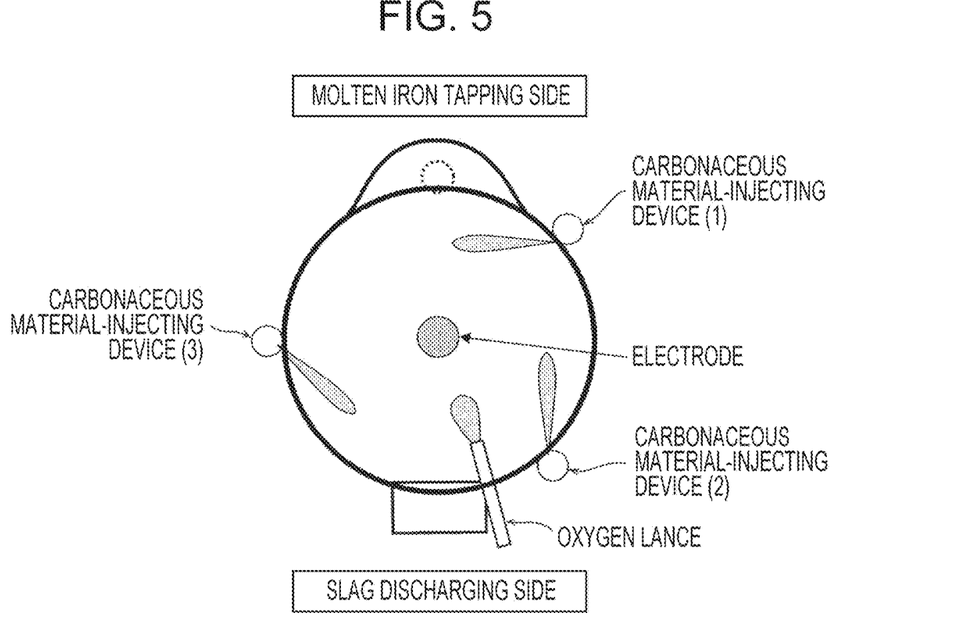
FIG. 5 is a schematic diagram illustrating the installation positions of carbonaceous material-injecting devices in the electric arc furnace used in Examples.

Tests (examples 1 to 9) were conducted by using an electric arc furnace having a carbonaceous material-injecting device having the structure illustrated in FIG. 2 and FIG. 3. In addition, for comparison, a test (comparative example) was conducted by using an electric arc furnace having a carbonaceous material-injecting device of a single-pipe nozzle type according to the related art (refer to FIG. 1(B)). FIG. 5 is a schematic horizontal sectional view of the electric arc furnace used for the tests. This electric arc furnace was a direct current-type electric arc furnace having a furnace diameter of about 6.3 m, a furnace height of about 4.1 m, a tapping capacity of about 120 tons, a water-cooled oxygen lance, and one electrode in the central portion thereof. In the case of examples 1 to 9, as illustrated in FIG. 5, three carbonaceous material-injecting devices were arranged in the circumferential direction of the furnace body. In addition, in the case of the comparative example, three carbonaceous material-injecting devices of a single-pipe nozzle type according to the related art were arranged in the circumferential direction of the furnace body.

The electric arc furnace operation conditions in the present EXAMPLES are given in Table 1.

TABLE 1

| | |
|---|---|
| Amount of Iron Scrap Charged | about 130 tons |
| Kind of Iron Scrap | Heavy H2 |
| Tapping Amount | about 120 tons |
| Oxygen Lance Flow Rate | 3000 Nm³/h |

TABLE 1-continued

| | |
|---|---|
| Amount of Lump Coke Charged | 1000 kg |
| Amount of Quicklime Charged | 500 kg |

The kind of the iron scrap used was Heavy H2 (in accordance with the prescription in "Uniform Standards of Ferrous Scraps" produced by The Japan Ferrous Raw Materials Association). After having charged the iron scrap into a bucket, the iron scrap was charged into the electric arc furnace in two steps, that is, before the start of operation and in the middle of the operation, in a total amount of about 130 tons. In addition, before the start of operation, as auxiliary raw materials, lump coke (1000 kg), which was an auxiliary fuel, and quicklime (500 kg), which was a slag-forming agent, were charged into the electric arc furnace via an auxiliary raw material chute (not illustrated). The injection of the carbonaceous material was performed in the period from the middle stage of the operation to the late stage of the operation, in which the molten iron and the molten slag were formed to some extent.

The use conditions of the carbonaceous material-injecting device in examples 1 to 9 are given in Table 2.

TABLE 2

| Injection Rate of Carbonaceous Material | | 60 kg/min to 80 kg/min |
|---|---|---|
| Carrier Gas | Kind of Gas | Air |
| | Flow Rate | 360 Nm³/h |
| Gas Fuel | Kind of Gas | LNG |
| | Flow Rate | 20 Nm³/h to 220 Nm³/h |
| Combustion-supporting Gas | Kind of Gas | Pure Oxygen |
| | Flow Rate | 48 Nm³/h to 532 Nm³/h |

Air was used as the carrier gas of the carbonaceous material, LNG was used as a gas fuel, and pure oxygen (industrial pure oxygen) was used as a combustion-supporting gas. In the case of examples 1 to 8, the injection rate of the carbonaceous material was 60 kg/min, and the flow rate of air, which was the carrier gas of the carbonaceous material, was 360 Nm³/h. In addition, in the case of example 9, the injection rate of the carbonaceous material was 80 kg/min, and the flow rate of air, which was the carrier gas of the carbonaceous material, was 360 Nm³/h. In the case of examples 1 to 9, the flow rate of LNG was varied in a range of 20 Nm³/h to 220 Nm³/h, and the flow rate of pure oxygen, which was a combustion-supporting gas, was varied in a range of 48 Nm³/h to 532 Nm³/h in accordance with the flow rate of LNG so that the oxygen ratio was constantly 1.1. In addition, in the case of the comparative example, the injection rate of the carbonaceous material was 60 kg/min, and air (the flow rate of air was 360 Nm³/h) was used as the carrier gas of the carbonaceous material. As the carbonaceous material, one of coke powder A, coke powder B, and coke powder C given in Table 3 was used.

TABLE 3

| | Kind of Coke Powder | | |
|---|---|---|---|
| | Coke Powder A | Coke Powder B | Coke Powder C |
| Fixed Carbon (mass %) | 88.9 | 87.3 | 88.1 |
| Volatile Matter (mass %) | 0.35 | 0.57 | 0.46 |
| Ash Matter (mass %) | 10.8 | 12.2 | 11.5 |
| Median Diameter D50 (μmm) | 126 | 15 | 22 |

In the present EXAMPLES, ten charges of carbonaceous material injection were performed in each of the examples 1 to 9 in such a manner that the first to tenth charges were performed with an injected carbonaceous material consumption rate of 1 kg/t, 2 kg/t, 3 kg/t, 4 kg/t, 5 kg/t, 6 kg/t, 7 kg/t, 8 kg/t, 9 kg/t, and 10 kg/t, respectively, by adjusting a carbonaceous material injection time to adjust the injected carbonaceous material consumption rate. For each of the examples, the average value of injected carbonaceous material consumption rate in the ten charges and the average value of electric power consumption rate in the ten charges were calculated from the injected carbonaceous material consumption rate and the electric power consumption rate, respectively, in each of the ten charges.

Figure 6:
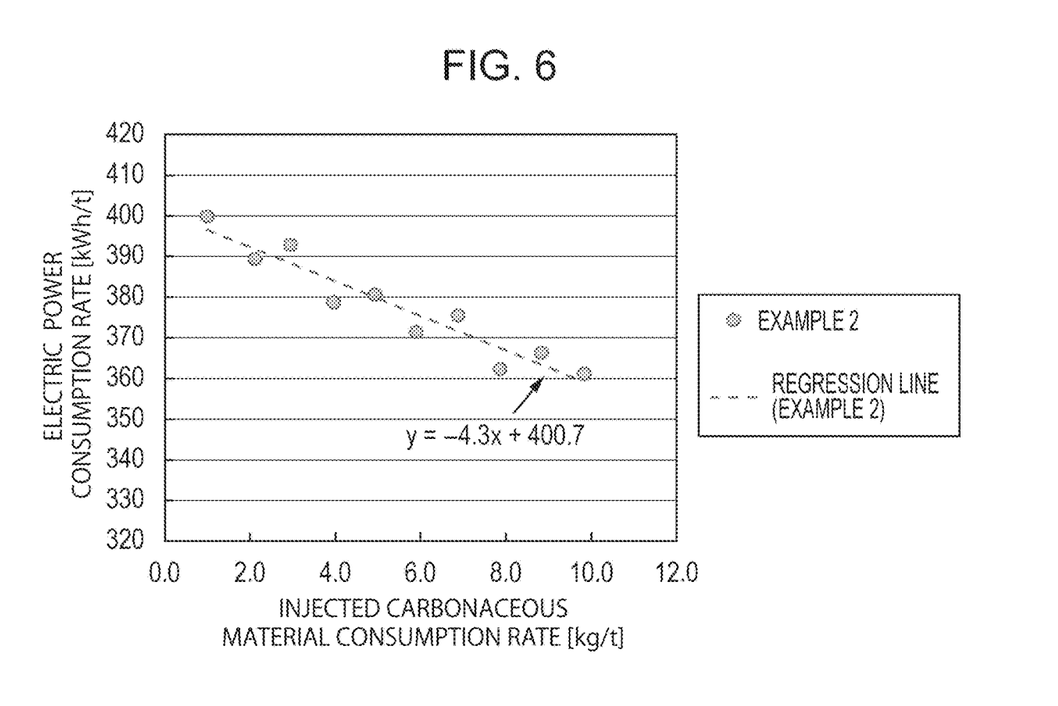
FIG. 6 is a graph illustrating an example of the relationship between injected carbonaceous material consumption rate and electric power consumption rate in Examples.

In addition, in each of the examples, by creating a simple regression equation from the values of the injected carbonaceous material consumption rate and the values of the electric power consumption rate in the ten charges, the slope a (simple regression equation: $y=-ax+b$) was defined as carbonaceous material efficiency (kWh/t/(kg/t)) and used for evaluation. For example, FIG. 6 illustrates the relationship between injected carbonaceous material consumption rate and electric power consumption rate in example 2. In this case, the carbonaceous material efficiency was 4.3 kWh/t/(kg/t).

The larger the value of the carbonaceous material efficiency, the higher the efficiency. The evaluation criteria are as follows: a case of a carbonaceous material efficiency of lower than 1.0 was judged as "x", a case of a carbonaceous material efficiency of 1.0 or higher and lower than 2.0 was judged as "Δ", a case of a carbonaceous material efficiency of 2.0 or higher and lower than 4.0 was judged as "○", and a case of a carbonaceous material efficiency of 4.0 or higher was judged as "⊙".

In addition, to evaluate the yield of the carbonaceous material taken into the molten iron, an analysis sample was taken from the molten iron in the furnace after iron scraps had been melted, and the carbon concentration in the molten iron was analyzed. The larger the value of the carbon concentration in the molten iron, the higher the efficiency. The evaluation criteria are as follows: a case of a carbon concentration in the molten iron of less than 0.050% was judged as "x", a case of a carbon concentration in the molten iron of 0.050% or more and less than 0.055% was judged as "Δ", a case of a carbon concentration in the molten iron of 0.055% or more and less than 0.060% was judged as "○", and a case of a carbon concentration in the molten iron of 0.060% or more was judged as "⊙".

In addition, by opening the furnace cover of the electric arc furnace between the charges, the state of the combustion flame generated in the carbonaceous material-injecting device was checked by performing visual observation. At this time, a case where the combustion flame was stably generated was judged as "○", a case where the combustion flame was unstable in such a manner that, for example, the flame was flickering or pulsating was judged as "Δ", and a case where the flame was completely lost was judged as "x".

In addition, the state of the flame and dust (including the carbonaceous material) blowing up through the openings of the electric arc furnace body was checked by performing visual observation. At this time, a case where there was a decrease in the degree of blowing up of the flame and dust through the openings of the furnace body compared with the case of the comparative example was judged as "○", a case where there was no difference in the degree of blowing up of the flame and dust through the openings of the furnace body from the case of the comparative example was judged as "Δ", and a case where there was an increase in the degree of blowing up of the flame and dust through the openings of the furnace body compared with the case of the comparative example was judged as "x".

Moreover, regarding comprehensive evaluation, a case which was judged as "x" regarding at least one of the carbonaceous material efficiency, the carbon concentration in the molten iron, the state of the combustion flame generated, and the state of the flame and dust blowing up through the openings of the electric arc furnace body described above was judged as "x", a case which was judged as "Δ" regarding at least one of such indices was judged as "Δ", and other cases were judged as "○".

The results of the evaluations described above are given in Table 4 along with the injection conditions of the carbonaceous material-injecting device.

TABLE 4

| Test Condition Number | Flow Rate of LNG (Nm³/h) | Injection Flow Velocity of LNG (m/s) | Combustion Rate of LNG (Mcal/h) | Flow Rate of Oxygen (Nm³/h) | Injection Flow Velocity of Oxygen (m/s) | Injection Flow Velocity of Carrier Gas (m/s) | Oxygen Ratio (—) | Kind of Coke Powder | Injection Rate of Carbonaceous Material (kg/min) | Combustion Rate of LNG/Injection Rate of Carbonaceous Material (Mcal/kg) |
|---|---|---|---|---|---|---|---|---|---|---|
| Comparative Example | — | — | — | — | — | 57 | — | A | 60 | — |
| Example 1 | 45 | 108 | 437 | 109 | 116 | 57 | 1.1 | A | 60 | 0.12 |
| Example 2 | 150 | 359 | 1455 | 363 | 388 | 57 | 1.1 | A | 60 | 0.40 |
| Example 3 | 200 | 479 | 1940 | 484 | 517 | 57 | 1.1 | A | 60 | 0.54 |
| Example 4 | 30 | 72 | 291 | 73 | 78 | 57 | 1.1 | A | 60 | 0.08 |
| Example 5 | 150 | 359 | 1455 | 363 | 388 | 57 | 1.1 | B | 60 | 0.40 |
| Example 6 | 220 | 527 | 2134 | 532 | 569 | 57 | 1.1 | A | 60 | 0.59 |
| Example 7 | 20 | 48 | 194 | 48 | 52 | 57 | 1.1 | A | 60 | 0.05 |
| Example 8 | 150 | 359 | 1455 | 363 | 388 | 57 | 1.1 | C | 60 | 0.40 |
| Example 9 | 45 | 108 | 437 | 109 | 116 | 57 | 1.1 | A | 80 | 0.09 |

| | Injected Carbonaceous | Electric | Carbonaceous Material Efficiency (kWh/t/(kg/t)) | Carbon Concentration in Molten Iron (mass %) | State of | State of Dust and Combustion Flame |

TABLE 4-continued

| Test Condition Number | Material Consumption Rate*1 (kg/t) | Power Consumption Rate*2 (kWh/t) | [Evaluation Is in Parentheses] | [Evaluation Is in Parentheses] | Combustion Flame Generated | Blowing up through Openings | Comprehensive Evaluation |
|---|---|---|---|---|---|---|---|
| Comparative Example | 5.6 | 395.8 | 0.9(X) | 0.049(X) | — | — | X |
| Example 1 | 5.6 | 390.0 | 2.2(○) | 0.053(Δ) | ○ | ○ | Δ |
| Example 2 | 5.4 | 377.7 | 4.3(⊙) | 0.059(○) | ○ | ○ | ○ |
| Example 3 | 5.5 | 371.4 | 4.8(⊙) | 0.061(⊙) | ○ | ○ | ○ |
| Example 4 | 5.6 | 391.0 | 1.3(Δ) | 0.053(Δ) | Δ | Δ | Δ |
| Example 5 | 5.6 | 385.5 | 2.4(○) | 0.055(○) | ○ | Δ | Δ |
| Example 6 | 5.6 | 381.0 | 3.2(○) | 0.057(○) | Δ | ○ | Δ |
| Example 7 | 5.6 | 392.5 | 1.1(Δ) | 0.052(Δ) | Δ | Δ | Δ |
| Example 8 | 5.6 | 381.0 | 3.1(○) | 0.056(○) | ○ | ○ | ○ |
| Example 9 | 5.6 | 391.8 | 1.7(Δ) | 0.053(Δ) | Δ | Δ | Δ |

*1average value of injected carbonaceous material consumption rate in ten charges
*2average value of electric power consumption rate in ten charges In Table 4, in the case of the comparative example where the carbonaceous material was simply injected with the carrier gas through the carbonaceous material-injecting device of a single-pipe nozzle type, since there was a decrease in the flow velocity of the injected carbonaceous material and carrier gas, much of the carbonaceous material may have been scattered outside the furnace without reaching the molten slag or the molten iron. When the carbonaceous material was injected, a flame blew up through openings such as an electrode port, which is considered to be corresponding to the lost amount of the injected carbonaceous material. The electric power consumption rate was 395.8 kWh/t, and the carbonaceous material efficiency was 0.9 kWh/t/(kg/t). That is, both indices were very low, and, therefore, this case was judged as "x" regarding the carbonaceous material efficiency. In addition, since the carbon concentration in the molten iron was 0.049 mass %, this case was judged as "x" also regarding the carbon concentration. Therefore, the comparative example was judged as "x" regarding comprehensive evaluation.

In contrast, in the case of the examples of the disclosed embodiments, since the carbonaceous material passed through a cylindrical combustion flame generated by the combustion reaction between LNG and oxygen and was efficiently injected into the molten slag and the molten iron, there is an increase in electric power consumption rate and carbonaceous material efficiency, and there is also an increase in the carbon concentration in the molten iron.

In the case of example 1, since there was an improvement in electric power consumption rate to 390.0 kWh/t and in carbonaceous material efficiency to 2.2 kWh/t/(kg/t), example 1 was judged as "○" regarding the carbonaceous material efficiency. In addition, since the carbon concentration in the molten iron was 0.053 mass %, example 1 was judged as "Δ" regarding this index. In addition, in the case of example 2, since there was an improvement in electric power consumption rate to 377.7 kWh/t and in carbonaceous material efficiency to 4.3 kWh/t/(kg/t), example 2 was judged as "⊙" regarding the carbonaceous material efficiency. In addition, since the carbon concentration in the molten iron was 0.059 mass %, example 2 was judged as "○" regarding this index. Moreover, in the case of example 3, since there was an improvement in electric power consumption rate to 371.4 kWh/t and in carbonaceous material efficiency to 4.8 kWh/t/(kg/t), example 3 was judged as "⊙" regarding the carbonaceous material efficiency. In addition, since the carbon concentration in the molten iron was 0.061 mass %, example 3 was judged as "⊙" regarding this index.

In addition, in the case of examples 1 to 3, since the fact that a stable combustion flame was generated was confirmed by performing visual observation, these cases were judged as "○" regarding the state of the combustion flame generated. Similarly, since there was a significant decrease in the degree of blowing up of dust and the flame through the openings such as an electrode port when the carbonaceous material was injected compared with the case of the comparative example, these cases were judged as "○" regarding this index.

From the results described above, example 1 was judged as "Δ" regarding comprehensive evaluation. Examples 2 and 3 were judged as "○" regarding comprehensive evaluation.

In the case of example 4, since the flow rate of LNG was as low as 30 Nm$^3$/h, the injection flow velocity of LNG was 72 m/s, that is, lower than those of examples 1 to 3, which resulted in a deterioration in the stability of the combustion flame. In addition, it is considered that there was also a decrease in the degree of the acceleration of the carbonaceous material and the carrier gas compared with the case of examples 1 to 3. Moreover, it is considered that, since the ratio of the combustion rate of LNG to the injection rate of the carbonaceous material was 0.08 Mcal/kg, there was an excessively small combustion rate, which resulted in the effect of the disclosed embodiments not being sufficiently realized. Consequently, the electric power consumption rate was 391.0 kWh/t, and the carbonaceous material efficiency was 1.3 kWh/t/(kg/t). Therefore, example 4 was judged as "Δ" regarding the carbonaceous material efficiency. In addition, since the carbon concentration in the molten iron was 0.053 mass %, example 4 was judged as "Δ" regarding this index. In addition, since the combustion flame was sometimes flickering, that is, unstable, depending on the state in the furnace, example 4 was judged as "Δ" regarding the state of the combustion flame generated. In addition, since there was no difference in the degree of blowing up of the flame and dust through the openings of the furnace body such as the electrode port when the carbonaceous material was injected from the case of the comparative example, example 4 was judged as "Δ" regarding this index. From the results described above, example 4 was judged as "Δ" regarding comprehensive evaluation.

Example 5 was performed under the same conditions as those applied for example 2 with the exception that coke powder B was used as the carbonaceous material. In the case of example 5, the electric power consumption rate was 385.5 kWh/t, and the carbonaceous material efficiency was 2.4 kWh/t/(kg/t). Therefore, example 5 was judged as "○" regarding the carbonaceous material efficiency. In addition, since the carbon concentration in the molten iron was 0.055 mass %, example 5 was judged as "○" regarding this index. In addition, since it was confirmed that a stable combustion flame was generated by performing visual observation, example 5 was judged as "○" regarding the state of the combustion flame generated. In addition, since there was no difference in the degree of blowing up of the flame and dust through the openings such as the electrode port when the carbonaceous material was injected from the case of the comparative example, example 5 was judged as "Δ" regarding this index. From the results described above, example 5 was judged as "Δ" regarding comprehensive evaluation.

In the case of example 5, there was a decrease in carbonaceous material efficiency compared with the case of example 2. It is considered to be because there was a difference in the particle diameter of the coke powder between examples 2 and 5. That is, it is considered that, since the particle diameter of coke powder B, which was used in example 5, was smaller than that of coke powder A, which was used in example 2, coke powder B is less likely to be separated from the carrier gas, which resulted in a decrease in carbonaceous material efficiency.

In the case of example 6, since the flow rate of LNG was 220 Nm$^3$/h, there was a deterioration in the stability of the combustion flame due to an increase in the injection flow velocity of LNG to 527 m/s, which was higher than that of examples 1 to 3, resulting in a decrease in the effect of increasing the yield of the carbonaceous material. Consequently, the electric power consumption rate was 381.0 kWh/t, and the carbonaceous material efficiency was 3.2 kWh/t/(kg/t). Therefore, example 6 was judged as "○" regarding the carbonaceous material efficiency. In addition, since the carbon concentration in the molten iron was 0.057 mass %, the example 6 was judged as "○" regarding this index. In addition, since the combustion flame was sometimes pulsating, example 6 was judged as "Δ" regarding the state of the combustion flame generated. In addition, since there was a significant decrease in the degree of blowing up of dust and the flame through the openings such as an electrode port when the carbonaceous material was injected compared with the case of the comparative example, example 6 was judged as "○" regarding this index. From the results described above, example 6 was judged as "Δ" regarding comprehensive evaluation.

In the case of example 7, it is considered that, since the flow rate of LNG was 20 Nm$^3$/h, the injection flow velocity of LNG was as low as 48 m/s, which was lower than that of the carrier gas, there was a deterioration in the stability of the combustion flame, and it was not possible to realize the effect of increasing the flow velocity of the carbonaceous material and the carrier gas due to the combustion flame. In addition, it is considered that, since the ratio of the combustion rate of LNG to the injection rate of the carbonaceous material was 0.05 Mcal/kg, that is, the combustion rate was excessively low, it was not possible to sufficiently realize the effect of the disclosed embodiments. Consequently, the electric power consumption rate was 392.5 kWh/t, and the carbonaceous material efficiency was 1.1 kWh/t/(kg/t). Therefore, example 7 was judged as "Δ" regarding the carbonaceous material efficiency. In addition, since the carbon concentration in the molten iron was 0.052 mass %, example 7 was judged as "Δ" regarding this index. In addition, since the combustion flame was sometimes flickering, that is, unstable, depending on the state in the furnace, example 7 was judged as "Δ" regarding the state of the combustion flame generated. In addition, since there was no difference in the degree of blowing up of the flame and dust through the openings such as the electrode port when the carbonaceous material was injected from the case of the comparative example, example 7 was judged as "Δ" regarding this index. From the results described above, example 7 was judged as "Δ" regarding comprehensive evaluation.

Example 8 was performed under the same conditions as those applied for example 2 and example 5 with the exception that coke powder C was used as the carbonaceous material. In the case of example 8, the electric power consumption rate was 381.0 kWh/t, and the carbonaceous material efficiency was 3.1 kWh/t/(kg/t). Therefore, example 8 was judged as "○" regarding the carbonaceous material efficiency. In addition, since the carbon concentration in the molten iron was 0.056 mass %, example 8 was judged as "○" regarding this index. In addition, since it was confirmed that a stable combustion flame was generated by performing visual observation, example 8 was judged as "○" regarding the state of the combustion flame generated. In addition, since there was a significant decrease in the degree of blowing up of the flame and dust through the openings such as the electrode port when the carbonaceous material was injected compared with the case of the comparative example, example 8 was judged as "○" regarding this index. From the results described above, example 8 was judged as "○" regarding comprehensive evaluation.

It is considered that the reason why the results of example 8 were better than those of example 5 was because, since the particle diameter of coke powder was larger in example 8 than in example 5, there was an increase in separation capability from the carrier gas.

Example 9 was performed under the same test conditions as those applied for example 1 with the exception that the injection rate of the carbonaceous material was 80 kg/min. It is considered that, since the ratio of the combustion rate of LNG to the injection rate of the carbonaceous material was 0.09 Mcal/kg, that is, the combustion rate was excessively low, it was not possible to sufficiently realize the effect of the disclosed embodiments. Consequently, the electric power consumption rate was 391.8 kWh/t, and the carbonaceous material efficiency was 1.7 kWh/t/(kg/t). Therefore, example 9 was judged as "Δ" regarding the carbonaceous material efficiency. In addition, since the carbon concentration in the molten iron was 0.053 mass %, example 9 was judged as "Δ" regarding this index. In addition, since the combustion flame was sometimes flickering, that is, unstable, when the carbonaceous material was injected, example 9 was judged as "Δ" regarding the state of the combustion flame generated. In addition, since there was no difference in the degree of blowing up of the flame and dust through the openings such as the electrode port when the carbonaceous material was injected from the case of the comparative example, example 9 was judged as "Δ" regarding this index. From the results described above, example 9 was judged as "Δ" regarding comprehensive evaluation.

The invention claimed is:

1. A method for manufacturing molten iron with an electric arc furnace, in which a cold iron source is melted to manufacture molten iron, the electric arc furnace having a carbonaceous material-injecting device, the method comprising:
   in the carbonaceous material-injecting device, while a carbonaceous material is injected with a carrier gas through a central portion of the carbonaceous material-injecting device, injecting a fuel and a combustion-supporting gas through respective outer peripheral portions of the carbonaceous material-injecting device, wherein the carbonaceous material injected through the central portion passes through a cylindrical combustion flame generated by a combustion reaction between the fuel and the combustion-supporting gas and is injected into molten slag and molten iron, while the combustion-supporting gas is supplied such that an oxygen ratio with respect to an amount of the fuel supplied into the carbonaceous material-injecting device is in a range of 1.0 to 1.1.

2. The method for manufacturing molten iron with an electric arc furnace according to claim 1, wherein injection flow velocities of the fuel and the combustion-supporting gas in the carbonaceous material-injecting device are higher than an injection flow velocity of the carrier gas of the carbonaceous material in the carbonaceous material-injecting device.

3. The method for manufacturing molten iron with an electric arc furnace according to claim 1, wherein the carbonaceous material-injecting device has a structure in which a carbonaceous material injection pipe, a fuel injection pipe, and a combustion-supporting gas injection pipe are arranged coaxially from the central portion of the carbonaceous material-injecting device.

4. The method for manufacturing molten iron with an electric arc furnace according to claim 1, wherein injection flow velocities of the fuel and the combustion-supporting gas in the carbonaceous material-injecting device are in a range of 100 m/s to 500 m/s.

5. The method for manufacturing molten iron with an electric arc furnace according to claim 1, wherein a combustion rate of the fuel in the carbonaceous material-injecting device is 400 Mcal/h or more.

6. The method for manufacturing molten iron with an electric arc furnace according to claim 1, wherein a ratio of a combustion rate of the fuel to an injection rate of the carbonaceous material in the carbonaceous material-injecting device is 0.1 Mcal/kg or more.

7. The method for manufacturing molten iron with an electric arc furnace according to claim 2, wherein the carbonaceous material-injecting device has a structure in which a carbonaceous material injection pipe, a fuel injection pipe, and a combustion-supporting gas injection pipe are arranged coaxially from the central portion of the carbonaceous material-injecting device.

8. The method for manufacturing molten iron with an electric arc furnace according to claim 2, wherein injection flow velocities of the fuel and the combustion-supporting gas in the carbonaceous material-injecting device are in a range of 100 m/s to 500 m/s.

9. The method for manufacturing molten iron with an electric arc furnace according to claim 2, wherein a combustion rate of the fuel in the carbonaceous material-injecting device is 400 Mcal/h or more.

10. The method for manufacturing molten iron with an electric arc furnace according to claim 2, wherein a ratio of a combustion rate of the fuel to an injection rate of the carbonaceous material in the carbonaceous material-injecting device is 0.1 Mcal/kg or more.

* * * * *